United States Patent Office 3,099,690
Patented July 30, 1963

3,099,690
PREPARATION OF ORGANIC PHOSPHORUS COMPOUNDS FROM PHOSPHORUS, AN ALKYL HALIDE, AND AN ORGANO-MAGNESIUM HALIDE
Michael M. Rauhut, Norwalk, and Andrew M. Semsel, Stamford, Conn., assignors to American Cyanamid Company, Stamford, Conn., a corporation of Maine
No Drawing. Filed July 24, 1962, Ser. No. 212,124
3 Claims. (Cl. 260—606.5)

The present invention relates to organophosphorus compounds and to the preparation of same. More particularly, the instant discovery concerns secondary and tertiary aryl, alkyl and cycloalkyl phosphines, tetra-substituted phosphonium salts thereof, and tetralkylcyclotetraphosphines.

Pursuant to the present invention elemental phosphorus is brought into reactive contact, in the presence of an inert organic solvent, such as tetrahydrofuran, with an organomagnesium halide and an alkyl halide to produce the corresponding organophosphorus compounds.

According to a typical embodiment, white phosphorus is added to a solution of n-butylmagnesium bromide and butyl bromide in ether. The resulting mixture is refluxed for several hours and then tributylphosphine, tetrabutylphosphonium bromide and tetrabutylcyclotetraphosphine, for example, are recovered therefrom by distillation. As will be seen hereinafter, the addition of water to said resulting mixture after reaction of the phosphorus, organomagnesium halide and alkyl halide reactants results in the production of the secondary phosphines as well, viz., dibutylphosphine.

Typical organomagnesium halides within the purview of the instant discovery are mono- and di-nuclear aryl magnesium halides, alkyl ($C_1$-$C_{12}$) magnesium halides and cycloalkyl magnesium halides, such as:

n-butylmagnesium bromide,
n-butylmagnesium chloride,
methylmagnesium iodide,
1-naphthylmagnesium iodide,
3-(trifluoromethyl)phenylmagnesium chloride,
4-fluorophenylmagnesium bromide,
4-methoxyphenylmagnesium chloride,
octylmagnesium bromide,
heptylmagnesium bromide,
hexylmagnesium bromide,
cyclohexylmagnesium chloride,
n-dodecylmagnesium chloride,
heptafluoropropylmagnesium bromide,
6-methoxy-2-naphthylmagnesium chloride,
n-propylmagnesium chloride,
4-tolylmagnesium bromide,
4-chlorophenylmagnesium iodide, and the like.

Obviously, from the above list of organometallic compounds, the organic moiety may or may not be substituted. Typical substituents for the organic moiety are those which under the conditions of the reaction contemplated herein are inert: halogen, such as fluorine, and the like, lower alkoxy, such as methoxy, ethoxy, propoxy and butoxy, and like substituents.

The elemental phosphorus reactant may be employed, as indicated hereinabove, as a finely-divided white phosphorus. However, elemental phosphorus in a different physical state, such as molten phosphorus or phosphorus in the form of "chunks," or other similar fractions, may be employed.

Typical alkyl halides within the purview of the instant discovery are those having from 1 to 12 carbon atoms in the alkyl moiety, such as the halides of: methyl-, ethyl-, propyl-, butyl-, pentyl-, hexyl-, heptyl-, octyl-, nonyl-, decyl-, undecyl-, and dodecyl-. Typical halide moieties intended herein are chlorine, bromine, and iodine.

As pointed out above, the reactants are brought together in the presence of an inert organic solvent, i.e., a solvent which under the conditions of the reaction described herein does not react to any substantial degree with the reactants. Typical inert solvents are ethers, such as the following: tetrahydrofuran (THF), diethylether, dibutylether, anisole, diethylether of diethyleneglycol, dioxane, and mixtures thereof.

In any given reaction of the type contemplated herein the reaction product mixture contains one or more of the organophosphorus compounds described hereinabove, viz., secondary organic phosphine, tertiary organic phosphine, tetra-substituted phosphonium salts thereof, or tetra-substituted-cyclotetraphosphine. The reaction equation is essentially as follows:

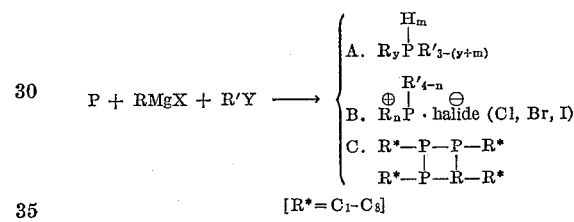

$R$ = organic moiety of organomagnesium halide reactant
$R'$ = organic moiety of organic halide reactant
$X$ = Cl, Br, I
$Y$ = Cl, Br, I
$m$ = 0 or 1
$y$ = 1 or 2
$n$ = 1 or 2

Certain reaction conditions favor A or B or C. For example, the best yields of A are achieved operating at a temperature in the range of 20° C. to 85° C., although significant yields are realized at temperatures in the broader range of 0° C. to 100° C. Generally a ratio of P:RMgX:R'Y of about 2:1.5:1.5 to about 2:4:4 is used. When Y is chloride, temperatures at the upper end of the broad range just given are generally used; when Y is iodide temperatures at the lower end of the range are best suited.

The reaction mixture, when water is added thereto, as indicated above, yields the corresponding secondary phosphine, particularly when the reaction conditions just recited are employed.

In order to increase the yields of B in the above equation, temperatures on the order of 75° C. to 180° C. are used, although temperatures as low as 50° C. and as high as 200° C. provide significant yields. Generally a reactant ratio P:RMgX:R'Y of at least 2:2:3, preferably at least 2:4:4, is employed. The addition of water to the reaction product mixture is optional, since it does not enter into the reaction but may be used to extract the phosphonium salt from the reaction product mixture.

In the case of product C, above, best yields thereof are achieved at temperatures in the range of 30° C. to 80° C., although from 0° C. to 150° C. may be employed. A ratio of P:RMgX:R'Y of about 2:1:1 is preferred. A ratio of at least 2:0.7:0.7 up to 2:4:5 is generally used, however, the yields diminishing porportionately the farther away from the preferred ratio one gets.

It can be seen that the process of the present invention provides a novel, straightforward and ready route to numerous organophosphorus compounds. The products of Formulae A and C hereinabove have direct utility as gasoline additives, since up to about 10 milliliters of any one of the phosphines, when dissolved in one gallon of gasoline, affords protection against misfiring, surface ignition, and the like.

On the other hand, the products of formula B, above, have direct utility as flame retardants on cotton cloth. For example, a small but effective amount of a product represented by B may be dissolved in a suitable solvent, such as isopropyl alcohol (heating the alcohol enhances solubility), cotton cloth dipped into the resulting solution and then dried. The phosphonium salt acts as a flame retardant on the cotton cloth.

The reactants of the present invention may be brought together in any sequence. Good results are obtained by establishing a solution of the organometallic reactant and the alkyl halide in an inert organic solvent and adding the elemental phosphorus thereto.

The products are separated and recovered by conventional means, as will be seen hereinafter, such as by distillation, filtration, or the like, depending upon the solubility of the product.

The present invention will best be understood from the following typical examples:

EXAMPLE I

*Reaction of Butyl Magnesium Bromide With White Phosphorus and Butyl Bromide*

White phosphorus (31.0 grams, 1.0 gram atom) is cut into 0.3 gram pieces under water and washed with acetone and with benzene. The phosphorus is added in one portion to a solution of 0.55 mole of butylmagnesium bromide and 75.4 grams (0.55 mole) of butyl bromide in 300 milliliters of tetrahydrofuran under nitrogen. The mixture is stirred at reflux (82° C.) for one hour. A white solid separates and the mixture becomes very thick. The reaction mixture is cooled to 25° C., diluted with 400 milliliters of ether, and treated dropwise with 200 milliliters of water. The mixture is filtered from a small amount of magnesium hydroxide, and the phases are separated. The aqueous phase is extracted with three 50 milliliter portions of ether, and the combined organic phases are dried over anhydrous sodium sulfate. Distillation of the organic phase gives 9.0 grams of dibutylphosphine, a trace of tributylphosphine, and 37.2 grams of tetrabutyltetracyclophosphine.

EXAMPLE II

*Reaction of White Phosphorus Butylmagnesium Bromide and Butyl Bromide*

To a stirred refluxing (71° C.–75° C.) mixture of 12.4 grams (0.4 gram atom) of white phosphorus, 137.0 grams (1.0 mole) of butyl bromide, and 100 milliliters of tetrahydrofuran (THF) under a nitrogen atmosphere is added dropwise 0.6 mole of butylmagnesium bromide in 500 milliliters of tetrahydrofuran during 90 minutes. Stirring at the reflux temperature is continued for 6 hours. The reaction mixture is cooled to room temperature and treated dropwise with 15 milliliters of water followed by 100 milliliters of 48% aqueous hydrobromic acid. Seventy-five milliliters of ether is added and the aqueous phase is separated. The aqueous phase is evaporated to dryness under reduced pressure (15 milliliters mercury), and the residue is extracted with chloroform. The chloroform extract is dried over anhydrous sodium carbonate and distilled to obtain 4.2 grams of dibutylphosphine, 1.0 gram of tributylphosphine, and 6.1 grams of tetrabutylcyclotetraphosphine. The residue from the distributor consists of 13.8 grams of tetrabutylphosphonium bromide.

Distillation of the dried organic phase from the reaction provides an additional 4.3 grams of dibutylphosphine.

EXAMPLES III–XVIII

The following examples in Table I are carried out essentially as in Example II, above, excepting, of course, as shown in the table:

TABLE I

| Example No. | P + | RMgX + | R'Y | Temp., °C. | Ratio, P[1]:RMgX[2]:R'Y[2] | Organic solvent | Products |
|---|---|---|---|---|---|---|---|
| III [3] | P | n-Butylmagnesium bromide | Butyl bromide | 35 | 2:3:3 | $(C_2H_5)_2O$ | Dibutylphosphine, tributylphosphine. |
| IV [3] | P | n-Butylmagnesium chloride | Butyl chloride | 60 | 2:3:3 | THF | Do. |
| V [3] | P | Methylmagnesium iodide | Dodecyl iodide | 20 | 2:3:2 | $(C_2H_5)_2O$ | Methyldodecylphosphine, methyldidodecylphosphine, dimethyldodecylphosphine. |
| VI | P | 1-nephthyl-magnesium iodide. | Methyl iodide | 20 | 2:3:2 | THF | Methylbis-(1-nephthyl)-phosphine, dimethyl-1-naphthylphosphine. |
| VII | P | Phenylmagnesium bromide. | Isobutyl bromide | 50 | 2:3:3 | $(C_3H_7)_2O$ | Phenylbisisobutylphosphine. |
| VIII | P | 3-(trifluoromethyl) phenylmagnesium chloride. | Methyl iodide | 80 | 2:3:4 | THF | Trimethyl-3-(trifluoro-methyl) phenylphosphonium iodide. |
| IX | P | 4-fluorophenyl-magnesium bromide. | Butyl bromide | 150 | 2:4:4 | $(C_3H_7)_2O$ | Dibutylbis-4-fluorophenyl-phosphonium bromide, tributyl-4-fluorophenyl-phosphonium bromide. |
| X | P | Cyclohexylmagnesium chloride. | Octyl bromide | 80 | 2:2:6 | THF | Trioctylcyclohexyl-phosphonium bromide. |
| XI | P | 4-chlorophenyl-magnesium bromide. | Ethyl bromide | 75 | 2:5:3 | THF | Bis-4-chlorophenyldiethyl-phosphonium bromide. |
| XII | P | 4-methoxyphenyl-magnesium bromide. | Butyl bromide | 70 | 2:3:5 | THF | Tributyl-4-methoxyphenyl-phosphonium bromide. |
| XIII | P | n-Dodecylmagnesium bromide. | n-Dodecyl bromide | 70 | 2:3:5 | THF | Tetra-n-dodecylphosphonium bromide. |
| XIV | P | Heptafluoropropyl-magnesium bromide. | Butyl bromide | 70 | 2:4:4 | THF | Heptafluoropropyltributyl-phosphonium bromide. |
| XV | P | 6-methoxyl-2-naphthyl-magnesium chloride. | Methyl iodide | 70 | 2:4:4 | THF | 6-methoxy-2-naphthyltrimethylphosphonium iodide. |
| XVI | P | 4-tolylmagnesium chloride | ___do___ | 70 | 2:4:4 | THF | 4-tolyltrimethylphosphonium iodide. |
| XVII | P | Methylmagnesium bromide. | Methyl bromide | 70 | 2:1:2 | THF | Tetramethylcyclotetraphosphine. |
| XVIII | P | Octylmagnesium bromide | Octyl bromide | 70 | 2:1:1 | THF | Tetraoctylcyclotetraphosphine. |

[1] Gram atom.   [2] Mole.   [3] Water is added to reaction mixture before recovering products.

Clearly, the instant discovery encompasses numerous modifications within the skill of the art. Consequently, while the present invention has been described in detail with respect to specific embodiments thereof, it is not intended that these details be construed as limitations upon the scope of the invention, except insofar as they appear in the appended claims.

This application is a continuation-in-part of our copending application Serial No. 67,884, filed November 8, 1960, now abandoned.

We claim:

1. A method which comprises (a) bringing into reactive contact, in the presence of an inert organic solvent, elemental phosphorus, an alkyl halide and an organomagnesium halide selected from the group consisting of mono-nuclear aryl magnesium halide, di-nuclear aryl magnesium halide, substituted mono-nuclear aryl magnesium halide, substituted di-nuclear aryl magnesium halide, alkyl magnesium halide, and cycloalkyl magnesium halide, said substituents for the mono- and di-nuclear aryl magnesium moieties, alkyl magnesium moieties and cycloalkyl magnesium moieties being selected from the group consisting of halogen and lower alkoxy, and said alkyl moieties of the organomagnesium halide reactants hereinabove having from 1 to 12 carbon atoms, and (b) recovering the resulting corresponding organophosphorus compound selected from the group consisting of tertiary arylalkyl phosphine, tertiary alkyl phosphine, and tertiary cycloalkyl phosphine, tetra-substituted phosphonium salts thereof, and tetralkylcyclotetraphosphine.

2. The process of claim 1 wherein the reaction mixture is hydrolyzed before recovering the products and the corresponding secondary phosphine selected from the group consisting of secondary aryl phosphine, secondary alkyl phosphine, and secondary cycloalkyl phosphine is formed.

3. The process of claim 1 wherein butyl magnesium bromide, white phosphorus and butyl bromide are reacted.

No references cited.